US008559032B2

(12) United States Patent
Christiansen

(10) Patent No.: US 8,559,032 B2
(45) Date of Patent: Oct. 15, 2013

(54) AUTOMATICALLY CONFIGURING A RASTER IMAGE PROCESSOR

(75) Inventor: Robert Douglas Christiansen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3406 days.

(21) Appl. No.: 10/620,067

(22) Filed: Jul. 14, 2003

(65) Prior Publication Data

US 2005/0015779 A1    Jan. 20, 2005

(51) Int. Cl.
*G06F 3/12*    (2006.01)

(52) U.S. Cl.
USPC ........... 358/1.15; 358/1.1; 358/1.9; 358/1.18; 358/1.16; 358/1.17; 719/321; 719/327

(58) Field of Classification Search
USPC ...................... 358/1.15, 1.14, 1.13
See application file for complete search history.

(56) References Cited

U.S. PATENT DOCUMENTS

| | | | |
|---|---|---|---|
| 5,619,624 A * | 4/1997 | Schoenzeit et al. ........... | 345/418 |
| 5,859,711 A * | 1/1999 | Barry et al. .................. | 358/296 |
| 6,035,103 A * | 3/2000 | Zuber ............................ | 358/1.9 |
| 6,052,198 A * | 4/2000 | Neuhard et al. ............. | 358/1.15 |
| 6,219,155 B1 * | 4/2001 | Zuber ............................ | 358/1.9 |
| 6,327,050 B1 * | 12/2001 | Motamed et al. ............ | 358/1.18 |
| 6,362,828 B1 * | 3/2002 | Morgan ........................ | 345/582 |
| 6,441,920 B1 * | 8/2002 | Smith ............................ | 358/1.2 |
| 6,456,388 B1 * | 9/2002 | Inoue et al. .................. | 358/1.15 |
| 6,606,165 B1 * | 8/2003 | Barry et al. ..................... | 358/1.9 |
| 6,623,190 B1 * | 9/2003 | Lutz .............................. | 400/76 |
| 6,707,563 B1 * | 3/2004 | Barry et al. .................. | 358/1.14 |
| 7,202,961 B2 * | 4/2007 | Klosterman ................. | 358/1.15 |
| 7,242,487 B2 * | 7/2007 | Lucivero et al. ............. | 358/1.13 |
| 2002/0105664 A1 * | 8/2002 | Inoue et al. .................. | 358/1.13 |
| 2002/0109869 A1 * | 8/2002 | Eisele ........................... | 358/500 |

FOREIGN PATENT DOCUMENTS

WO    WO 9832096 A1 *    7/1998

* cited by examiner

*Primary Examiner* — Hilina K Demeter

(57) ABSTRACT

Systems and methods to configure a Raster Image Processor (RIP) are described. In one aspect, a networked computing environment includes a RIP manager coupled to at least one RIP engine. A print job is received. The RIP engine is requested to dynamically configure its RIPing operations when at least one of the RIP Engine's RIPing parameters is not congruent to a RIP manager supplied processing preference. Such dynamic configuration is requested in consideration of the RIP engine RIPing a particular portion of the print job.

22 Claims, 3 Drawing Sheets

AUTOMATICALLY CONFIGURING A RASTER IMAGE PROCESSOR

TECHNICAL FIELD

The invention pertains to image processing.

BACKGROUND

In print shop environments, digital vector data is generally expressed in a Page Description Language (PDL) data format. Examples of PDLs include, Hewlett-Packard's Printer Control Language® (PCL), Adobe's Portable Document Format® (PDF), or Adobe's PostScript® (PS). In print shop environments, digital image data are typically represented as JPEG, TIFF, and/or like data formats (such data formats can also be present in a print job). Prior to printing or otherwise presenting image data that is in any one of these digital data formats, vector data and image data must be rasterized. Rasterization or "raster image processing" (RIPing) is the process of translating digital vector and image data into bit-mapped data or raster bits for rendering by a printer or display device.

Efficient print job turn-around time is of paramount importance for successful print shop operations. In view of this, a print job can be divided into multiple partitions for rasterization by a pipeline of multiple RIPing engines (RIP engines). In such a scenario, each RIP engine in the pipeline RIPs a respective partition of the multiple partitions. Since multiple RIP engines RIP the print job in parallel, the print job is rasterized more efficiently than had only one RIP engine been used. Although this technique generally results in a faster print-job turn-around time, this technique is also substantially problematic due to existing pipeline configuration limitations.

One problem, for example, is that print shops are substantially limited with respect to which types of RIP engines can be used in a particular pipeline. If a print shop has N RIP engines of first manufacture and M RIP engines of second manufacture, the print shop generally cannot mix and match RIP engines from the first and second manufacturers to generate a pipeline without possibly introducing inconsistencies into the rasterized product. This is because RIP engine vendors, of which there are many, typically employ proprietary RIPing algorithms, software versions, font types, font versions, and so on, to rasterize PDL. For purposes of discussion RIP engines that implement different RIPing algorithms/resources, etc., with respect to one another are heterogeneous with respect to one another.

In print shop environments where multiple RIP engines can be utilized for RIPing jobs, the print shop may want to organize the RIP engines into various groupings. This grouping of a collection of RIP engines will be referred to as a pipeline.

Employing a particular RIPing algorithm, font type and/or font version, etc., on a set of data will generally result in diverse rasterization product as compared to had a different RIPing algorithm, font type and/or font version, etc., been used to RIP the data. To avoid undesired imaging defects (e.g., anomalous color shifts, font mismatch, etc.) in a printed document due to such diverse rasterization results, when a pipeline is to include multiple RIP engines, existing pipeline configuration techniques require all RIP engines in the pipeline to be of same software/hardware version and manufacture. In this manner, conventional techniques ensure that each partition of a print job will be RIP'd by a RIP engine of same manufacture and software/hardware version.

Although a pipeline configured with multiple homogeneous RIP engines ensures a quality end-product, such a technique substantially limits a print shop's ability to meet anticipated and unforeseen print shop workflow needs by not being able to flexibly configure pipelines with available heterogeneous RIPing resources.

The following systems and procedures address these and other limitations of existing techniques that utilize multiple RIP engines to rasterize a print job.

SUMMARY

Systems and methods to configure a Raster Image Processor (RIP) are described. In one aspect, a networked computing environment includes a RIP manager coupled to at least one RIP engine. A print job is received. The RIP engine is requested to dynamically configure its RIPing operations when at least one of the RIP Engine's RIPing parameters is not congruent to a RIP manager supplied processing preference. Such dynamic configuration is requested in consideration of the RIP engine RIPing a particular portion of the print job.

BRIEF DESCRIPTION OF THE DRAWINGS

The detailed description is described with reference to the accompanying figures.

DETAILED DESCRIPTION

An Exemplary Operating Environment

Figure 1:
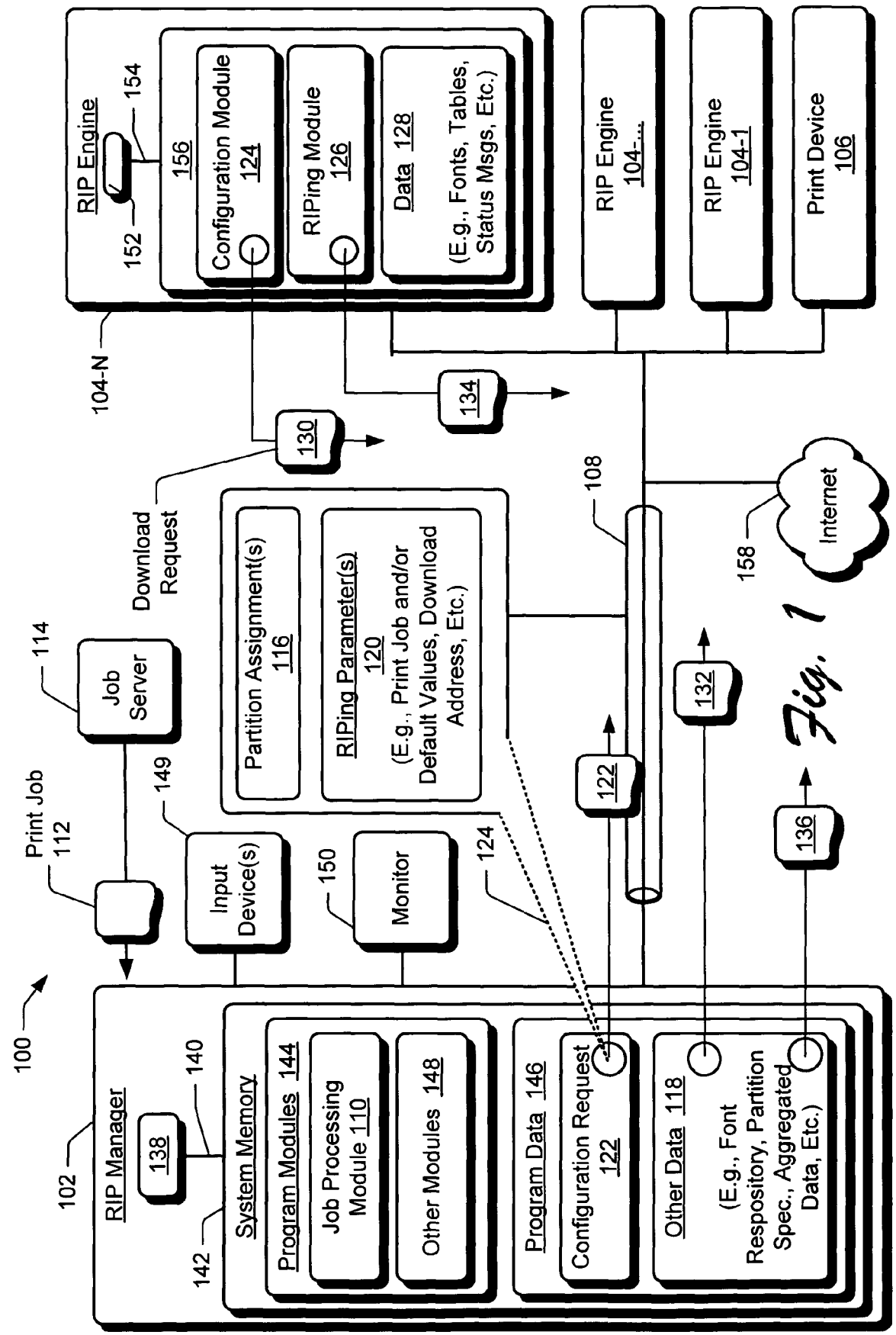
FIG. 1 is one embodiment of an exemplary suitable computing environment within which one embodiment for systems, apparatuses and methods to automatically configure a RIP engine may be implemented.

Turning to the drawings, wherein like reference numerals refer to like elements, the invention is illustrated as being implemented in a suitable computing environment. FIG. 1 is an exemplary suitable computing environment 100 within which systems, apparatuses and methods to configure a raster image processor (RIP) engine may be implemented. In particular, the system of FIG. 1 provides for cooperative image processing across heterogeneous RIP engines. Multiple RIP engines that respectively implement different RIPing algorithms/resources, etc., with respect to one another are often referred to as being "heterogeneous" with respect to one another. Exemplary computing environment 100 is only one example of a suitable computing environment and is not intended to suggest any limitation as to the scope of use or functionality of systems and methods the described herein.

Although not required, the invention will be described in the general context of computer-executable instructions, such as program modules executed in a distributed computing environment by a computer. Program modules generally include routines, programs, objects, components, data structures, etc., that perform particular tasks or implement particular abstract data types. In a distributed computing environment, program modules may be located in both local and remote memory storage devices.

As shown in FIG. 1, exemplary computing environment 100 includes RIP manager 102, one or more RIP engines 104-1 through 104-N, and a printing device 106. The RIP engines of this example are represented in a single RIP pipeline. These system components are coupled to one-another over communication path 108. The communication path represents any type of physical or wireless network communication infrastructure deployed, for example, as an organizational Intranet or public network such as the Internet.

The RIP manager 102 includes job processing module 110, which is a computer-program module configured to receive a print job 112 from job server 114. The print job includes, for example, print data expressed in Page Design Language (PDL) to be rendered by the printing device 106. To this end, the job processing module divides the print data into multiple partitions, each partition for RIPing by a respective RIP engine 104 (i.e., one of the RIP engines 104-1 through 104-N). A partition is some number of pages of the print job. The pages in any one partition may be consecutive or non-consecutive.

The job processing module 110 generates partition assignments 116 by assigning the partitions to selected ones of the RIP engines 104-1 thorough 104-N for RIPing. Each partition assignment indicates a number of pages of the print job 112 that are to be RIP'd by a specific RIP engine. The partition assignments are also stored in a partition specification, or job layout. For purposes of discussion, the partition specification is represented as a portion of "other data" 118. The partition specification further indicates partition ordering as a function of the layout of the print job 112. Additionally, when a partition is assigned to a specific RIP engine, the job processing module 110 updates a partition RIP status in the partition specification from "unassigned" to "assigned", or equivalent value.

The job processing module 110 generates each assignment of partition assignments 116, at least in part, as a function of whether a RIP engine 104-1 through 104-N can perform RIPing operations in accordance with one or more RIPing parameters 120. Such parameters include, for example, the ability to RIP a particular PDL type (i.e., the PDL used to express portions of the print job 112), use of a particular RIPing algorithm (e.g., a specific halftoning technique, software version, etc.), a set of desired font characteristics required by the print job, press designations (generically as a press family type or as a specific individual press), ICC profiles (color management), and so on. The RIPing parameters represent RIP manager 102 supplied processing preferences.

In one implementation, the job processing module 110 evaluates, for example, a header in the print job 112 to identify one or more specified RIPing parameters 120. In another implementation, a standard Job Definition Format (JDF®) is used to order the parameters in a job ticket. The job ticket specifies one or more parameters for a print job 112, including those needed for RIPing, printing, activities involved in a workflow, and/or the like. When one or more RIPing parameters are left unspecified, or to be overridden, the job processing module 110 may set the specific parameters to default values, for example, as specified by a system administrator.

The job processing module 110 sends the partition assignments 116 and the RIPing parameters 120 to the indicated RIP engine(s) 104-1 through 104-N via a configuration request message 122. In one implementation, the RIPing parameters 120 are identified by the RIP manager 102 at initialization time by obtaining a list of resources, or "features" from a database (not shown). Components 116 and 120 of the configuration request 122 can be sent to the RIP engine(s) in any order and need not be encapsulated in a wrapper message. Receipt of a configuration request 122 by a RIP engine directs the RIP engine to dynamically configure its RIPing operations when its current RIPing resources are not substantially congruent with resources identified by the received RIPing parameters 120.

In one implementation, a RIP engine 104-1 through 104-N that is requested to perform such dynamic configuration is a first RIP engine of first and second heterogeneous RIP engines in a pipeline. (As noted above, multiple RIP engines that respectively implement different RIPing algorithms/resources, etc., with respect to one another are often referred to as being "heterogeneous" with respect to one another). In this scenario, the dynamic configuration request 122, besides preparing the first RIP engine to RIP an assigned portion of the print job 112 in accordance with RIP manager 102 processing preferences, is further directed to configuring the first RIP engine to process its assigned portion using the same RIPing parameters 120 that will be used by the second RIP engine to RIP a different portion of the print job.

Responsive to receiving a configuration request 122, a RIP engine 104 (i.e., a respective one of the RIP engines 104-1 through 104-N), or more particularly, the RIP engine's configuration ("Config.") module 124, assesses whether the RIPing module 126 has access to the resource(s) identified by the RIPing parameters 120. Such resources include, for example, any combination of specific RIPing algorithm(s), font(s), versions, default values, etc. For instance, if RIPing parameters 120 specify that the print job 112 requires a particular font of a particular font distributor (e.g., a Times New Roman truetype font distributed by Adobe, Inc.), the configuration module 124 checks the RIP engine's font repository to determine if the requested font is available. For purposes of discussion, such a local font repository is represented by "other data" 128.

In yet another example, if received RIPing parameters 120 specify that the print job 112 is to be RIP'd using a particular halftoning algorithm, the RIP engine's configuration module 124 checks the software version of the RIPing module 126 to verify that the requested halftoning algorithm is available. To this end, "other data" 128 further includes, for example, a table that maps software versions to specific RIPing algorithms such as the particular halftoning algorithm, and so on.

If any of the RIPing resources associated with the RIPing parameters 120 is/are not available in memory local to the RIP engine 104, then the configuration module 124 sends a download request message 130 to the job processing module 110 to request the needed resource(s). Responsive to receiving the download request, the job processing module transmits the requested resources as one or more electronic messages 132 to requesting configuration module 124. Responsive to successfully downloading and installing the downloaded resource(s) 132, the RIP engine communicates a success/operational status message (e.g., see, "other data 128) to the job processing module.

In one implementation, the configuration request 122 includes information to identify at least one network (Intranet or Internet 158) address from which a RIP engine 104-1 through 104-N may download each of the resource(s) that is associated with the listed RIPing parameters 120.

For one reason or another a RIP engine 104-1 through 104-N may not be able to download and/or install resource(s) associated with the received RIPing parameters 120. For instance, the RIP engine may be configured with limited processing and/or memory resources to the extent that it is incapable of downloading, installing, and/or executing a requested software update/version, RIPing algorithm, and/or the like). In one implementation, to assist the RIP engine to evaluate such a condition, the RIPing parameters 120 includes, for example, a suggested minimum size for memory needed to implement/access at least a subset of the resources specified by the RIPing parameters 120, or other information that can be used by the configuration module 124 to quickly evaluate whether it can perform the requested configuration.

If a RIP engine 104-1 through 104-N determines that it cannot download, install, or otherwise implement substantially all of the resource(s) identified in the received configuration request 122, the RIP engine communicates a failure status message to the job processing module 110. Such a status message is represented in "other data 128. Responsive to receiving such a status message from a particular RIP engine, or responsive to determining that a certain amount of time has passed since the configuration request was communicated to the RIP engine with no associated response, the job processing module re-assigns the RIP engine's print job partition to a different RIP engine for rasterization.

Next, a RIP engine 104-1 through 104-N then determines whether it has a copy of the print job 112 in a memory local to the RIP engine that is accessible by the RIP engine. If the print job is not stored in such local memory, then the RIP engine requests a copy of the print job from the job processing module 110. Responsive to the request, the RIP manager 102 transmits a copy of the print job 112 to the RIP engine. In this implementation, the print job is communicated only a single time to any one of the RIP engines. That is to say, after the print job is downloaded to a particular RIP engine to RIP a first assigned partition, the print job is then available in the local memory of the RIP engine for RIPing of any subsequently assigned partitions. In another implementation, only one or more portions of the print job 112 are communicated to respective RIP engines on an as needed basis.

The RIP engine 104-1 through 104-N determines the one or more specific print job pages to RIP. This determination is based on the contents of the partition assignments 116. The RIP engine then RIPs the one or more pages using resources that correspond to the RIPing parameters 120, and thereby generates RIP'd data 134. RIP'd data is communicated to the job processing module 110. Although not shown for each respective one of the RIP engines, each RIP engine that is assigned a partition via partition assignments 116 will RIP the partition to generate a respective RIP'd data 134.

Once the job processing module 110 has received respective RIP'd data 134 for each of the partitions of the print job 112, the job processing module sorts the RIP'd data into an order corresponding to the ordering of the associated PDL in the print job. The sorted data is then aggregated and bundled with the partition specification for communication as aggregated data 136 to the print device 106 for subsequent printing of the RIP'd data.

Exemplary RIP Manager Computing Resources

As shown in FIG. 1, the RIP manager 102 includes, for example, a processor 138 coupled across a bus 140 to a system memory 142. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

System memory 142 includes a variety of computer readable media. Such media may be any available media that is accessible by processor 138, and it includes both volatile and non-volatile media, removable and non-removable media. In particular, the system memory includes computer-readable media in the form non-volatile memory, such as read-only memory (ROM), and/or volatile memory, such as random access memory (RAM). The RIP manager 102 may further include other removable/non-removable, volatile/non-volatile computer storage media (not shown) such as a hard disk drive, a CD-ROM, a magnetic tape drive, and so on.

The RAM portion of the system memory 142 contains program modules 144 and program data 146 that are immediately accessible to and/or presently being operated on by the processor 138. For instance, the program modules include job processing module 110 to automatically configure a RIP engine to rasterize a print job, and other modules 148 such as an operating system (OS) to provide a runtime environment, a RIP resource pipeline configuration routine, and so on.

The program data 146 portion of system memory 142 includes dynamic amounts of data as a function of the configuration of the RIP manager 102, the particular processing stages of the job processing module 110, and the time at which data is received from respective ones of the RIP engines 104-1 through 104-N, and so on. For instance, program data includes a copy of print job 112, a configuration request 122, which includes partition assignments 116 and RIPing parameters 120, and other data 118. Other data includes, for example, copies of the resources identified in the RIPing specification 120 such as a font and software repository for downloading to a requesting RIP engine. Other data 118 further includes, for example, a partition specification for keeping track of the partitions of the print job that have been RIP'd, copies of RIP'd data 134, a copy of a download request 130, sorted and aggregated data 136, workflow scheduling data (not shown), and so on.

A user may provide commands and information into the RIP manager 102 through one or more input devices 149 such as a keyboard and pointing device such as a "mouse". Other input devices may include a scanner, camera, etc. These and other input devices are connected to the processing unit 138 through an input interface (not shown) coupled to the bus 140, but may be connected by other interface and bus structures, such as a parallel port, game port, a universal serial bus (USB), or Firewire (IEEE 1394). Optionally, the RIP manager may also be coupled to a monitor 150 with a user interface to allow a system administrator to specify one or more portions of the RIPing parameter(s) 120.

Exemplary RIP Engine Computing Resources

Rip engines 104-1 through 104-N can be implemented across any number of computing devices. Such computing devices includes, for example, a processor 152 coupled across a bus 154 to a system memory 156. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

System memory 156 includes a variety of computer readable media. Such media may be any available media that is accessible by the RIP engine, and it includes both volatile and non-volatile media, removable and non-removable media. In particular, the system memory, or "local memory", includes computer-readable media in the form non-volatile memory, such as read-only memory (ROM), and/or volatile memory, such as random access memory (RAM). The RIP engine may further include other removable/non-removable, volatile/non-volatile computer storage media (not shown) such as a hard disk drive, a CD-ROM, a magnetic tape drive, and so on.

The RAM portion of the system memory 156 contains program modules and program data that are immediately accessible to and/or presently being operated on by the processor 152. For instance, the program modules include configuration module 124 to configure the engine's RIPing operations as a function of received RIPing parameters 120, and RIPing module 126 to RIP portions of the print job 112 in accordance with the configured requested RIPing parameters. The program data portion of system memory includes data 128. At various stages of processor 152 operation, data 128 includes, for example, a copy of the print job 112, RIP'd data 134, a copy of the configuration request 122, which in turn includes copies of the partition assignments 116 and RIPing parameters 120, a download request 130, as well as local configuration data (e.g., loaded fonts, version mapping tables, and/or the like).

An Exemplary Procedure

Figure 2:
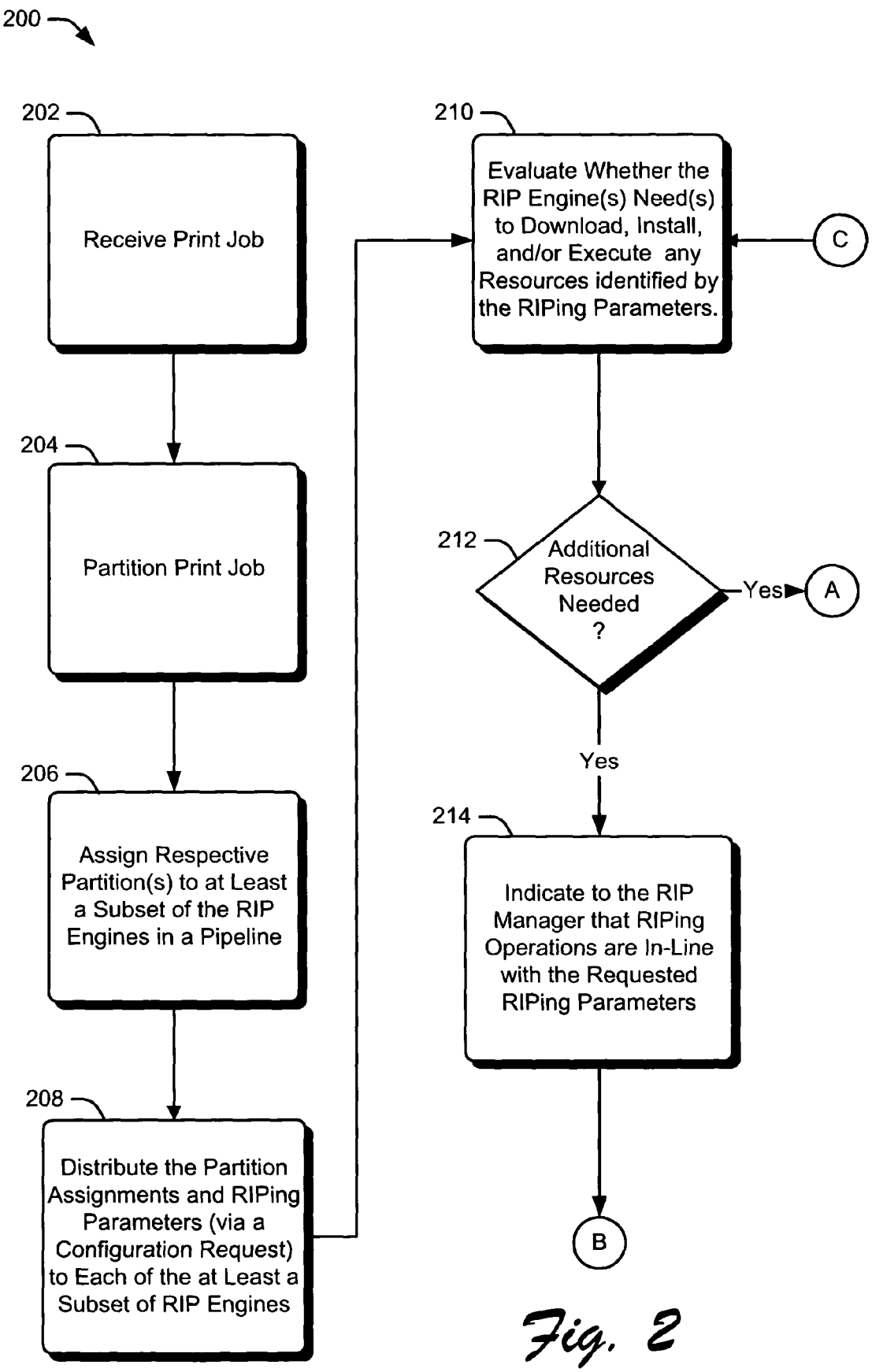
FIG. 2 is an exemplary procedure to automatically configure a RIP engine according to one embodiment.

FIG. 2 shows an exemplary procedure 200 to automatically configure a raster image processor (RIP). For purposes of discussion, the operations of the exemplary procedure are discussed in reference to various components of FIG. 1. The RIP (or RIPs) being configured by this procedure is a selected one of the RIP engines 104-1 through 104-N. At block 202, the RIP manager 102 (FIG. 1) receives a print job 112 (FIG. 1). At block 204, the job processing module 110 (FIG. 1) of the RIP manager divides the print job into multiple partitions. At block 206, the job processing module assigns the respective partitions to at least a subset of the RIP engines in a pipeline. At block 208, the RIP manager distributes the partition assignments 116 (FIG. 1) and a set of RIPing parameters to each of the at least a subset of RIP engines via a configuration request 122 (FIG. 1) message.

The configuration request 122 (FIG. 1) directs a receiving RIP engine to dynamically configure its RIPing operations with respect to at least one RIPing parameter when the RIPing parameter is not congruent to a RIP manager 102 (FIG. 1) supplied processing preference. For purposes of discussion, such a RIP manager processing preference is represented as one or more parameters (e.g., a RIPing algorithm, software version, a font design, a font version, and/or other configurable RIP engine parameters) as specified in RIPing parameter(s) 120 (FIG. 1). The RIP manager requests the RIP engine to perform such dynamic configuration in consideration of the RIP engine RIPing an assigned portion of the print job.

At block 210, the RIP engine evaluates whether it needs to download, install, and/or execute any of the RIPing resource(s) identified by the received RIPing parameters 120 (FIG. 1). At block 212, if additional RIPing resources are needed, the procedure continues at block 302 of FIG. 3, as indicated by on page reference "A". Otherwise, at block 212, if no additional RIPing resources are needed, the procedure continues at block 214, wherein the RIP engine indicates to the RIP Manager that its operations are in synchronization with the RIP manager's requested RIPing parameters 120 (FIG. 1). In one implementation, such an indication is accomplished by sending a status message (e.g., a portion of "other data" 128 of FIG. 1) to the job processing module 110 (FIG. 1). At this point, the procedure continues at block 310 of FIG. 3, as indicated by on page reference "B".

Figure 3:
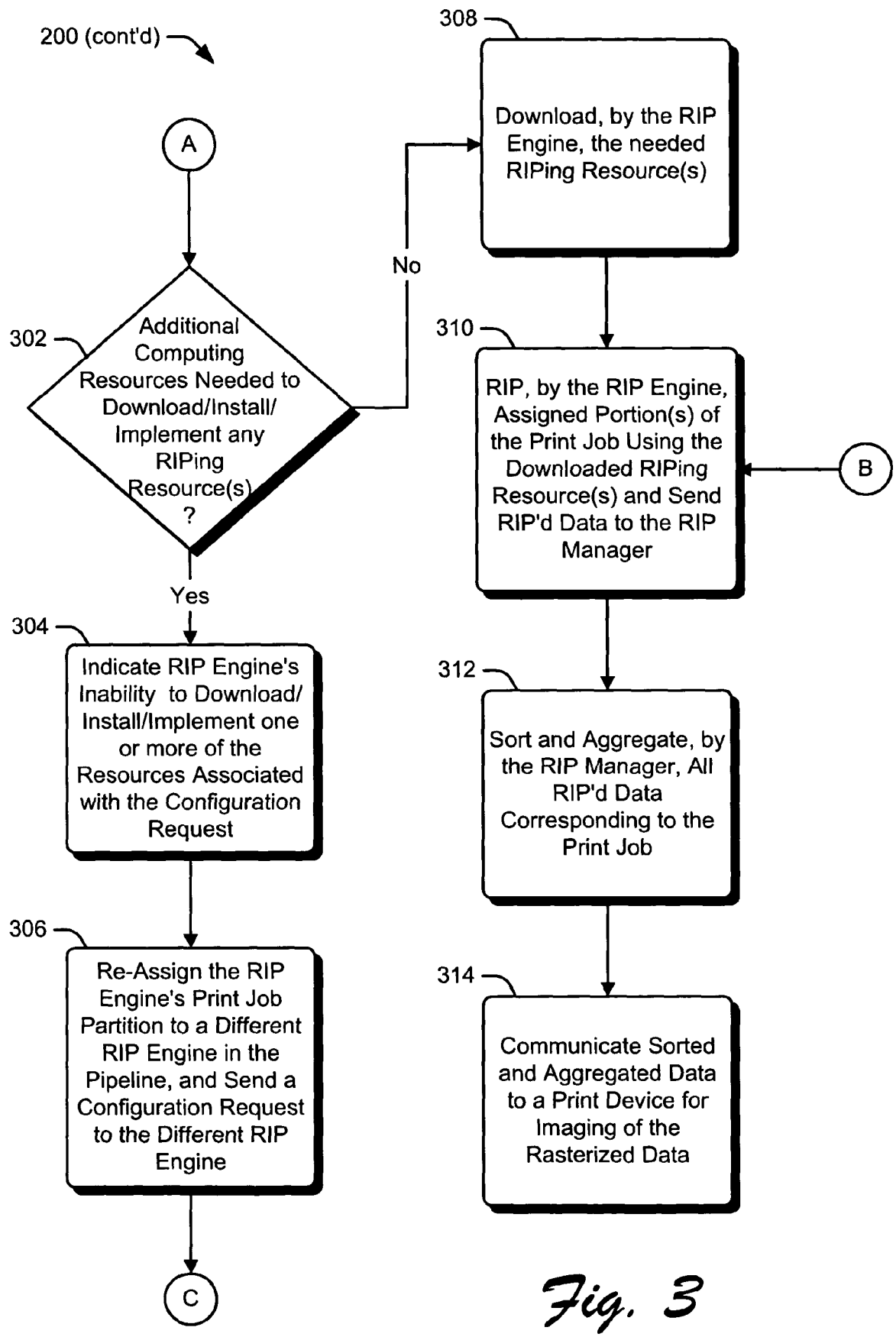
FIG. 3 is a continuation of the exemplary embodiment of the procedure of FIG. 2 to automatically configure a RIP engine.

FIG. 3 shows further aspects of the exemplary procedure of FIG. 2 to automatically configure a RIP engine. At block 302, the RIP engine determines whether it has the computing resources (e.g., available memory, processor configuration, etc.) to download and/or implement any of the RIPing resource(s) identified in the configuration request 122 (FIG. 1) received from the RIP manager 102. If so, at block 304, the RIP engine indicates such inability (e.g., via message receipt, time-out, etc.) to the job processing module 110 (FIG. 1). At block 306, responsive to receiving such an indication, the job processing module updates the partition assignments 116 (FIG. 1) by re-assigning the RIP engine's print job partition to a different RIP engine in the pipeline for subsequent rasterization. The job processing module also sends this information as well as the preferred RIPing parameters 120 (FIG. 1) to the different RIP engine via a configuration request 122 (FIG. 1). At this point, the procedure 200 continues at block 210 of FIG. 2, as indicated by on-page reference "C".

At block 308, the RIP engine has determined that it has the computing resources (e.g., available memory, processor configuration, etc.) to download, install, and/or execute the additional or replacement RIPing resource(s). In light of this, the RIP engine proceeds to download the RIPing resource(s) as one or more electronic messages 132 (FIG. 1), each downloaded resource corresponding to at least a subset of the RIPing parameters 120 (FIG. 1). In one implementation, the RIP engine 104-1 through 104-N downloads the resource(s) 132 (FIG. 1) from the RIP manager 102 and/or from a different computing device via a network address (Intranet or Internet 158) identified in the configuration request 122 (FIG. 1) or via a preconfigured network address stored in memory local to the RIP engine.

At block 310, the RIP engine 104-1 through 104-N RIPs an assigned portion of the print job 112 (FIG. 1) using the resource(s) downloaded at block 308, and sends corresponding RIP'd data 134 (FIG. 1) to the job processing module 110 (FIG. 1). At block 312, the job processing module sorts and aggregates RIP'd data received from each of the RIP engines that were used to RIP a respective portion of the print job. At block 314, the job processing module communicates the sorted and aggregated data 136 (FIG. 1) to the print device 106 (FIG. 1) for printing and the procedure ends.

In this manner, the procedure 200 configures any number of RIP engines 104-1 through 104-N, regardless of whether they are heterogeneous with respect to one another, to RIP respective portions of a print job 112 (FIG. 1) in a substantially similar manner; using same algorithms, fonts, and so on. This avoids undesired imaging defects that would typically result from use of heterogeneous RIP engines to print portions of a same print job (as described in the background section above).

CONCLUSION

The described systems and methods automatically configure a RIP engine to process a print job according to a particular set of parameters/criteria. Although the systems and methods have been described in language specific to structural features and methodological operations, the subject matter as defined in the appended claims are not necessarily limited to the specific features or operations described. The specific features and operations are disclosed as exemplary forms of implementing the claimed subject matter.

The invention claimed is:

1. In a networked computing environment including a Raster Image Process (RIP) manager coupled to at least one RIP engine, a method for the RIP manager to automatically configure the RIP engine, the method comprising:

receiving a print job; and
requesting the RIP engine to perform dynamic configuration of at least one RIPing parameter when the RIPing parameter is not congruent to a RIP manager supplied processing preference, the dynamic configuration being requested in consideration of the RIP engine RIPing a particular portion of the print job.

2. A method as recited in claim 1, wherein the at least one RIPing parameter is a RIPing algorithm, a resource/software version, a particular font, or a color profile.

3. A method as recited in claim 1:
wherein the RIP engine is a first RIP engine of first and second RIP engines in a pipeline;
wherein the first and second RIP engines are heterogeneous with respect to one another; and
wherein requesting the RIP engine to perform dynamic configuration is further directed to configuring the first RIP engine to process the particular portion using same RIPing parameters as used by the second RIP engine to RIP a different portion of the print job.

4. A method as recited in claim 1, wherein the method further comprises downloading, by the RIP engine, any configuration resource(s) indicated by RIP manager supplied processing preference(s) that are not locally available to the RIP engine.

5. A method as recited in claim 4, wherein RIP engine downloads configuration resource(s) from a network address identified by the RIP manager.

6. A method as recited in claim 1, wherein the method further comprises:
directing the RIP engine to communicate a status to the RIP manager indicating whether the RIP engine can perform the dynamic configuration in accordance with the RIP manager supplied processing preference; and
wherein the status determines whether the RIP engine or a different RIP engine in the pipeline will RIP the particular portion.

7. A method as recited in claim 6, wherein the status is a response message or a lapse of time.

8. A method as recited in claim 1, wherein the method further comprises:
responsive to determining that the RIP engine cannot successfully RIP the print job in accordance with the RIP manager supplied processing preference;
identifying a different RIP engine that can or has performed such dynamic configuration of the at least one RIPing parameter; and
communicating the particular portion to the different RIP engine for RIPing in accordance to the RIP manager supplied processing preference.

9. A method as recited in claim 1, wherein the method further comprises:
determining that the RIP engine can successfully RIP the print job in accordance with the RIP manager supplied processing preference; and
responsive to the determining, communicating the particular portion to the RIP engine for RIPing in accordance to the RIP manager supplied processing preference.

10. A non-transitory computer-readable medium having computer-program instructions executable by a processor for automatically configuring a raster image processor (RIP) engine stored thereon, the computer-program instructions comprising instructions for:
evaluating a print job to identify a set of RIPing parameters;
communicating the RIPing parameters to a RIP engine to direct the RIP engine to automatically configure its RIPing operations to conform to the RIPing parameters; and,
requesting the RIP engine to perform dynamic configuration of at least one RIPing parameter when the RIPing parameter is not congruent to a supplied processing preference, the dynamic configuration being requested in consideration of the RIP engine RIPing a particular portion of the print job.

11. A non-transitory computer-readable medium as recited in claim 10, wherein the RiPing parameters indicate one or more specific RiPing algorithms, font resources, color profiles, and/or software versions.

12. A non-transitory computer-readable medium as recited in claim 10, wherein the computer-program instructions further comprise instruction for supplementing or replacing the RIPing parameters with one or more default RIPing parameters.

13. A non-transitory computer-readable medium as recited in claim 10, wherein the computer-program instructions further comprise instruction for:
receiving a download request from the RIP engine, the download request identifying at least a subset of the RIPing parameters; and
responsive to the download request, communicating resources corresponding to the at least a subset of the RIPing parameters to the RIP engine for subsequent installation by the RIP engine to configure its RIPing operations.

14. A non-transitory computer-readable medium as recited in claim 10, wherein the computer-program instructions further comprise instruction for directing the RIP engine to RIP at least a portion of a print job using resource(s) associated with the RIPing parameters.

15. A non-transitory computer-readable medium as recited in claim 10, wherein the RIP engine is a first RIP engine of first and second RIP engines in a pipeline, and wherein the computer-program instructions further comprise instructions for:
determining that the first RIP engine cannot successfully RIP a print job in accordance with the RIPing parameters;
responsive to the determining, automatically configuring the second RIP engine to perform RIPing operations in accordance to the RIPing parameters; and
communicating a particular portion of a print job to the second RIP engine for RIPing, the particular portion having previously been assigned to the first RIP engine.

16. A raster image processor (RIP) manager computing device comprising the processor coupled to the computer-program instructions recited in claim 10.

17. A non-transitory computer-readable medium comprising computer-program instructions executable by a processor for automatically configuring a raster image processor (RIP) engine coupled to a RIP manager, the computer-program instructions comprising instructions for:
receiving, by the RIP engine, a request to configure RIPing operations in accordance with one or more parameters specified by the RIP manager;
responsive to receiving the request, the RIP engine configuring RIPing operations based on the one or more parameters; and,
receiving by the RIP engine from the RIP manager a request to perform dynamic configuration of at least one RIPing parameter when the RIP parameter is not congruent to a RIP manager supplied processing preference, the dynamic configuration being requested in consideration of the RIP engine RIPing a particular portion of the print job.

18. A non-transitory computer-readable medium as recited in claim 17, wherein the one or more parameters are associated with one or more of a particular RIPing algorithm, font resource, and/or software version.

19. A non-transitory computer-readable medium as recited in claim 17, wherein the computer-program instructions further comprise instructions for downloading one or more resources corresponding to the one or more parameters from an identified network address.

20. A non-transitory computer-readable medium as recited in claim 17, wherein the identified network address is provided to the RIP engine by the RIP manager and/or stored in the computer-readable medium, which is local to the RIP engine.

21. A non-transitory computer-readable medium as recited in claim 17, wherein the computer-program instructions further comprise instructions for:
   determining that computer resources of the RIP engine are insufficient to download and/or install one or more resources corresponding to the one or more parameters from an identified network address; and
   responsive to the determining, re-assigning and communicating a portion of a print job assigned to the RIP engine to a different RIP engine coupled to the RIP manager.

22. A computing device comprising the processor coupled to the computer-readable medium as recited in claim 17.

* * * * *

UNITED STATES PATENT AND TRADEMARK OFFICE
CERTIFICATE OF CORRECTION

PATENT NO. : 8,559,032 B2  Page 1 of 1
APPLICATION NO. : 10/620067
DATED : October 15, 2013
INVENTOR(S) : Robert Douglas Christiansen It is certified that error appears in the above-identified patent and that said Letters Patent is hereby corrected as shown below:

In the claims

In column 10, line 8, in Claim 11, delete "RiPing" and insert -- RIPing --, therefor.

In column 10, line 9, in Claim 11, delete "RiPing" and insert -- RIPing --, therefor.

Signed and Sealed this
Sixth Day of October, 2015

Michelle K. Lee
*Director of the United States Patent and Trademark Office*